United States Patent [19]

Jensen

[11] Patent Number: 4,648,465
[45] Date of Patent: Mar. 10, 1987

[54] RESILIENTLY MOUNTED EARTH SMOOTHING ROLLER

[75] Inventor: Finn U. H. Jensen, Vemmelev, Denmark

[73] Assignee: Kongskilde Koncernselskab A/S, Soro, Denmark

[21] Appl. No.: 640,571

[22] Filed: Aug. 14, 1984

[30] Foreign Application Priority Data

Aug. 22, 1983 [DK] Denmark ............................ 3829/83

[51] Int. Cl.⁴ ...................... A01B 21/04; A01B 35/28
[52] U.S. Cl. .................................... 172/551; 172/573; 172/556
[58] Field of Search ............... 172/551, 572, 573, 540, 172/543, 548, 556

[56] References Cited

U.S. PATENT DOCUMENTS

| | | | |
|---|---|---|---|
| 617,070 | 1/1899 | Anderson | 172/547 |
| 688,626 | 12/1901 | Friberg | 172/551 X |
| 889,486 | 6/1908 | Ross | 172/572 |
| 925,926 | 6/1909 | Lindgren | 172/547 |
| 1,058,140 | 4/1913 | Beene | 172/551 |
| 1,800,634 | 4/1931 | Isenberg | 172/547 X |
| 3,452,826 | 7/1969 | Lehman | 172/551 |
| 3,967,685 | 7/1976 | Siekmeier | 172/551 |
| 4,102,406 | 7/1978 | Orthman | 172/551 |
| 4,231,433 | 11/1980 | Whitfield | 172/551 |
| 4,415,041 | 11/1983 | Fackler | 172/573 |

Primary Examiner—Richard J. Johnson
Attorney, Agent, or Firm—Anthony A. O'Brien

[57] ABSTRACT

An implement for levelling the surface of an agricultural field, a so-called furrow-smoother, comprises a plurality of rings of rotary knives to throw the surface earth laterally away from the higher areas. The rings of knives are journalled in bearings which are suspended from a carrier frame by means of arms that extend below the bearings and substantially tangentially therefrom so as not to catch plant remains (straw, stem, and root material) carried along by the two knife rings sweeping on either side of the bearing arm.

1 Claim, 2 Drawing Figures

RESILIENTLY MOUNTED EARTH SMOOTHING ROLLER

FIELD AND BACKGROUND OF THE INVENTION

The invention relate to an implement for working the surface of an agricultural field, especially to be used behind a tined harrow for the purpose of smoothing out the furrowed pattern left by the harrow tines, comprising a frame carrying a plurality of hubs each associated with a plurality of blades or knives to throw the surface earth laterally from the higher areas (the ridges) to the lower areas (the furrows), at least some of the knives being arranged relative pairs each of which is journalled in a intermediate bearing suspended from the frame by means of an arm. An implement of this type is known, e.g. from U.S. Pat. No. 4,382,474.

All of the knife assemblies may be arranged in this way so that each pair has its own suspended bearing-equipped hub, or several knife assemblies may have a common shaft or shaft section whereby the number of arms may be reduced relative to the number of knife assemblies. The knives incorporated in one or more pairs of assemblies may be firmly mounted on a common shaft or on connected shaft sections so that the knives in question rotate in unison but often it is preferred that the knife assemblies are freely and independently rotatable.

No matter which one of these arragements is used, plant remains such as straw material in stubble-fields as well as tough and long roots (couch-grass) may be very liable to restrain the rotation of the knife assemblies by penetrating into the hub area and wrapping up around the shafts, and to completely prevent the knife rotation when they are caught by the usual arms extending almost vertically from the knife assemblies to the carrying frame. Thus, when treating fields with a great amount of plant remains of the kind referred to, frequent interruptions of the work may be unavoidable, particularly when plant remains have to be torn off after having formed dense lumps or accumulations on the lower portions of the arms and thereby prevent rotation of the adjacent knife assemblies.

SUMMARY OF THE INVENTION

An aim of the invention is to eliminate this trouble or to provide an implement which will not be blocked up by plant remains accumulating on the supporting arms and especially in the spaces between such arms and the adjacent knife assemblies sweeping past the arms.

According to the invention this purpose is achieved by the feature that the arm extends from a low point of the hub structure and is directed backwardly, reckoned in the working direction of the implement, and then upwardly to a point beyond the disc area of the knife assemblies.

In this case plant remains which are caught by a knife, or possibly by two blades of adjacent knife assemblies, and are brought along upwardly laterally from the surface of the field will not always be prevented from interference with the supporting arm but they will meet the edge thereof which faces away from the hub and extends substantially tangentially therefrom and, consequently, by the continued rotation of the knives such plant remains will be positively displaced along the arm edge away from the hub and also towards the tip ends of the knives. When the plant remains in this way have come beyond the disc area (the area swept by the knives) they will no more be held against the arm and will be free to fall down on the field behind the implement. The arm as well as the rotary knives will consequently be free from adherring straw material, roots, and similar plant remains which could restrain or prevent the rotation of the knives.

The support arm may be formed, totally or in part, by a substantially rigid sheet or rod section but according to the invention it consists preferably of a smoothly curved spring. By the use of the implement such a spring will be subjected to vibration which will promote the disengagement of plant remains that have temporarily been retained, and besides the resilient suspension will protect the knife assemblies against damage when hitting stones and will further reduce the resistance of the implement against turning when drawn over the field.

According to the invention it is also preferred that the edge of the arm facing away from the hub is sharpened. This will facilitate a cutting or tearing up of straw or stem material and roots, which by the knives are caused to slide along the edge so that the possible tendency of the plant remains to adhere to the arm is further reduced.

BRIEF DESCRIPTION OF THE DRAWINGS

A preferred embodiment of the implement according to the invention is illustrated on the drawing in which.

DETAILED DESCRIPTION OF THE PREFERRED EMBODIMENT

Figure 1:
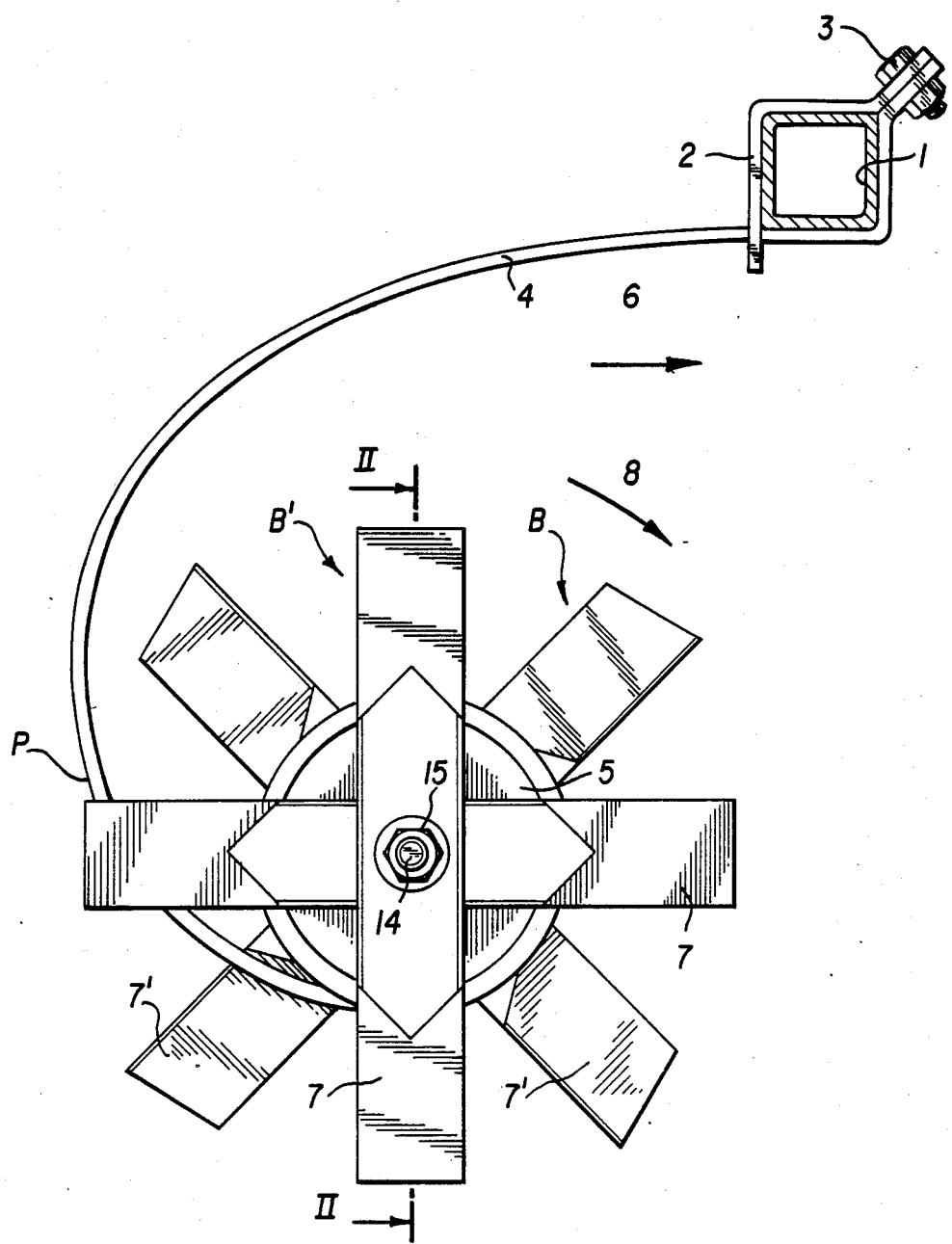
FIG. 1 shows a single pair of knife assemblies and the associated arm mounted on a carrier frame beam.

In the drawings 1 designates a square tube forming part of a carrier frame, not further shown, on which a smoothly curved arms 4 is secured by means of a clamp 2 with bolts 3. The implement comprises a plurality of substantially identical arms 4 spaced from one another along the length of beam 1. A hub structure 5 is mounted at the lower end portion of each the arms 4 which are substantially tangential to the under side of the hub and at this point are directed rearwardly relative to the direction of travel, marked by the arrow 6, of the implement when in use. This point of attachment of the arm 4 to the periphery of the hub 5 is approximately at the six o'clock point of the hub 5 as viewed in FIG. 1.

Associated with each hub 5 are two blade assemblies B—B each comprising a plurality of blades 7 and 7' spaced 90° apart and which through their shape in a well known manner may be operative, by rotation in the direction indicated by the arrow 8, to level or smooth out the surface of the field by lateral displacement of earth, e.g. from ridges to furrows left behind a preceeding tined harrow. The blade assemblies are journalled for rotary displacement relative the hub 5 as will be explained hereinafter.

The earth treated by the knife rings will often include plant remains such as more or less tough straw, stem, and root material that will be grasped by the knives or blades 7, 7' and carried along in their upward movement. Part of such material will rapidly get clear of the knives whereas another part will cling or adhere thereto until it meets the downwardly and backwardly facing edge of the support arm 4. However, due to the particular curved shape of the arm and its position relative to the hub 5, such plant remains will not be caught by the blade edge. By the rotation of the knives, the engaged material will be displaced away from the hub 5 and also radially outwards towards the tips of the knives. This causes a further portion of the collected plant material to get clear of both the arm 4 and the knives 7—7', and possible remains will get loose from these elements at the point where the arm crosses the circle swept by the knife tips which point is shown by P in FIG. 1.

As mentioned in the foregoing, the loosening may be promoted when the bearing arm 4 is formed by a smoothly curved spring, as assumed in connection with the drawing, and when its rear edge is appropriately sharp.

Figure 2:
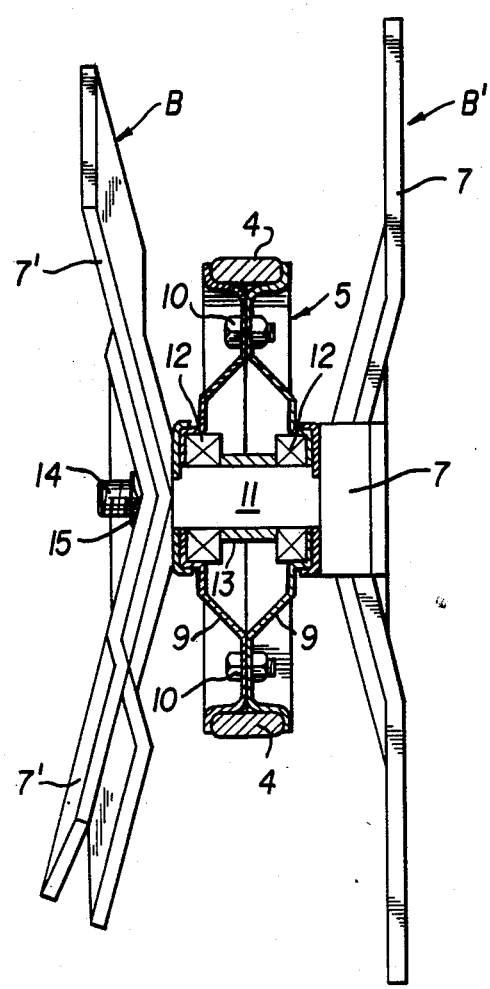
FIG. 2 is an enlarged view, partly in section, along line II—II of FIG. 1.

According to FIG. 2 each hub structure 5 may comprise a bearing formed by two symmetrical dished sheet metal elements 9 which are clamped together by means of bolts 10 and together form a peripheral groove in which the support arm 4 is received. A central trunnion 11 is journalled in a pair of ball bearings 12 mounted in the housing 9,9 and spaced by a sleeve 13 surrounding a trunnion 11. At each end the trunnion presents a threaded stud 14 on which the knife blades 7,7' forming the assembly B—B' are mounted and secured by means of nuts 15.

I claim:

1. An implement for working the surface of an agricultural field containing plant remains, comprising:
    a frame member extending generally transverse to the normal direction of travel of the implement;
    a plurality of hub structures each carrying a plurality of circumferentially spaced earth engaging knives extending radially therefrom, means rotatably supporting said knives relative said hub structure;
    arms mounted on said frame member and supporting said hub structures beneath said frame member, each of said arms extending rearwardly from said frame member and being curved downwardly and thence forwardly directed to a point engaging the bottom-most periphery of one respective said hub structure,
    whereby that portion of each of said arms immediately adjacent said hub structure prevents the accumulation of plant remains that can block the rotation of said knives as plant remains are driven rearwardly and upwardly by said knives and strike said downwardly curved and forwardly directed arm, and
    each arm is a curved spring member.

* * * * *